(12) United States Patent
Naito

(10) Patent No.: US 7,423,863 B2
(45) Date of Patent: Sep. 9, 2008

(54) SINTERED BODY ELECTRODE AND SOLID ELECTROLYTIC CAPACITOR USING THE ELECTRODE

(75) Inventor: Kazumi Naito, Chiba (JP)

(73) Assignee: Showa Denko K.K., Tokyo (JP)

( * ) Notice: Subject to any disclaimer, the term of this patent is extended or adjusted under 35 U.S.C. 154(b) by 214 days.

(21) Appl. No.: 10/552,589

(22) PCT Filed: Apr. 13, 2004

(86) PCT No.: PCT/JP2004/005235

§ 371 (c)(1),
(2), (4) Date: Oct. 12, 2005

(87) PCT Pub. No.: WO2004/093106

PCT Pub. Date: Oct. 28, 2004

(65) Prior Publication Data

US 2006/0204735 A1   Sep. 14, 2006

Related U.S. Application Data

(60) Provisional application No. 60/464,107, filed on Apr. 21, 2003.

(30) Foreign Application Priority Data

Apr. 14, 2003   (JP)   ............................... 2003-109146

(51) Int. Cl.
*H01G 9/04*   (2006.01)
(52) U.S. Cl. .................. 361/528; 361/523; 361/525; 361/529; 361/306.1; 361/301.2
(58) Field of Classification Search ......... 361/523–525, 361/516–519, 528–534, 502–512, 306.1, 361/306.3, 301.1, 301.3, 301.4; 29/25.01, 29/25.03
See application file for complete search history.

(56) References Cited

U.S. PATENT DOCUMENTS 4,097,911 A * 6/1978 Dorrian ...................... 361/305

(Continued)

FOREIGN PATENT DOCUMENTS

| EP | 0626358 A2 | 11/1994 |
| EP | 1137021 A1 | 9/2001 |
| JP | 55-128816 | 10/1980 |
| JP | 55-128816 A | 10/1980 |
| WO | WO 02/092864 A2 | 11/2002 |

OTHER PUBLICATIONS

Patent Abstracts of Japan, vol. 2003, No. 10, Oct. 8, 2003, & JP 2003 166002 A (Cabot Surpermetal KK), Jun. 13, 2003.

(Continued)

*Primary Examiner*—Nguyen T Ha
(74) *Attorney, Agent, or Firm*—Sughre Mion, PLLC

(57) ABSTRACT

A sintered body electrode for a sintered body electrode capacitor, which enables production of a solid electrolytic capacitor having a good capacitance appearance factor, including at least one member selected from an earth-acid metal, an alloy mainly comprising an earth-acid metal, an electrically conducting oxide of an earth-acid metal, and a mixture of two or more thereof. The value (pseudo-closed porosity) obtained by dividing the difference between the volume of a sintered body measured under atmospheric pressure and the volume measured in a vacuum, which are determined according to the Archimedes method, by the volume measured under atmospheric pressure is 11% or less. Also disclosed is a solid electrolytic element using the sintered body, a solid electrolytic capacitor using the element and use of the solid electrolytic capacitor.

21 Claims, 1 Drawing Sheet

U.S. PATENT DOCUMENTS

| | | | |
|---|---|---|---|
| 4,101,952 A * | 7/1978 | Burn | 361/305 |
| 5,034,857 A * | 7/1991 | Wong | 361/509 |
| 5,349,496 A * | 9/1994 | Taniguchi et al. | 361/528 |
| 5,629,830 A * | 5/1997 | Yamagami et al. | 361/535 |
| 6,136,062 A * | 10/2000 | Loffelholz et al. | 75/369 |
| 6,307,735 B1 * | 10/2001 | Saito et al. | 361/517 |
| 6,411,498 B2 * | 6/2002 | Nakamura | 361/523 |
| 6,510,044 B1 * | 1/2003 | Loffelholz et al. | 361/510 |

OTHER PUBLICATIONS

Patent Abstracts of Japan, vol. 2002, No. 03, Apr. 3, 2002, & JP 2001 330544 A (Nikko Materials Co Ltd), Nov. 30, 2001.

Patent Abstracts of Japan, vol. 015, No. 002 (M-1065), Jan. 7, 1991, & JP 02 254108 A (Permelec Electrode Ltd), Oct. 12, 1990.

* cited by examiner

SINTERED BODY ELECTRODE AND SOLID ELECTROLYTIC CAPACITOR USING THE ELECTRODE

CROSS REFERENCE TO THE RELATED APPLICATIONS

This is a 371 of PCT/JP2004/005235 filed Apr. 13, 2004, claiming the benefit of U.S.Provisional Application Ser. No. 60/464,107 filed Apr. 21, 2003.

TECHNICAL FIELD

The present invention relates to a sintered body for use in a solid electrolytic capacitor having a good capacitance appearance factor, and a solid electrolytic capacitor using the sintered body. More specifically, the present invention relates to a sintered body electrode for solid electrolytic capacitors, which uses, as the metal component, an earth-acid metal such as tantalum and niobium and is adjusted to have a pseudo-closed porosity of 11% or less, and also relates to a solid electrolytic capacitor using the sintered body electrode and having a good capacitance appearance factor.

BACKGROUND ART

In a known solid electrolytic capacitor, a sintered body is used as one electrode, a semiconductor layer working out to another electrode (counter electrode) is provided on the dielectric oxide film layer formed on the sintered body, and an electrically conducting layer is formed on the semiconductor layer. Such a solid electrolytic capacitor is demanded to have a high capacitance with a small size as much as possible. The sintered body is produced by appropriately shaping a valve-acting metal powder and sintering it. In the sintered body, pores are present and the portion other than pores forms a complicated shape such that a part of powder particles are melted and connected with each other.

As for the appearance capacitance of a solid electrolytic capacitor, 100% of capacitance is expected to appear when the dielectric oxide layer formed on the surface of a sintered body having the above-described internal shape is thoroughly covered up with another electrode. Assuming that the capacitance appearance factor is 100% when the other electrode is liquid and an electrolytic solution, it is demanded to approximate the capacitance appearance factor to 100% as much as possible when a solid semiconductor is used as the other electrode.

However, when the other electrode (counter electrode) is a semiconductor layer, the capacitance appearance factor can be hardly approximated to 100%. This is particularly difficult when the sintered body in the solid electrolytic capacitor has a large volume and moreover, a sintered body having a large CV value (a product of a voltage at electrochemical formation for forming a dielectric oxide film on the sintered body and a capacitance measured by using an electrolytic solution for the other electrode) is used.

On the other hand, JP-A-55-128816 (the term "JP-A" as used herein means an "unexamined published Japanese patent application") discloses that the ratio of pores of 2 μm or more occupying in the sintered body electrode is adjusted to 0.68 or more to decrease the density of a tantalum solid electrolytic capacitor element and thereby increase the electrostatic capacitance. However, this patent publication is silent on closed pores in the sintered body electrode. Also, there is not known a publication disclosing a sintered body electrode using, as the metal component, an earth-acid metal such as tantalum and niobium, where the pseudo-closed porosity is adjusted to 11% or less.

DISCLOSURE OF THE INVENTION

An object of the present invention is to provide a solid electrolytic capacitor exhibiting a good capacitance appearance factor even when the sintered body in the solid electrolytic capacitor has a large volume and moreover, a sintered body having a large CV value is used.

As a result of intensive investigations to solve the above-described problems, the present inventors have found that when in a sintered body using, as the metal component, an earth-acid metal such as tantalum and niobium, the value (pseudo-close porosity) obtained by dividing the difference between the volume of a sintered body measured under atmospheric pressure and the volume measured in a vacuum, which are determined according to the Archimedes method, by the volume measured under atmospheric pressure is adjusted to 11% or less and when a solid electrolytic capacitor is produced using this sintered body as one electrode, a good capacitance appearance factor can be obtained. The present invention has been accomplished based on this finding.

That is, the present invention relates to a sintered body electrode and a solid electrolytic capacitor using the sintered body electrode, which are described below.

1. A sintered body electrode for capacitors, comprising at least one member selected from an earth-acid metal, an alloy mainly comprising an earth-acid metal, an electrically conducting oxide of an earth-acid metal, and a mixture of two or more thereof, wherein the value obtained by dividing the difference between the volume of a sintered body measured under atmospheric pressure and the volume measured in a vacuum, which are determined according to the Archimedes method, by the volume measured under atmospheric pressure is 11% or less.

2. The sintered body electrode for capacitors as described in 1 above, wherein the earth-acid metal is tantalum.

3. The sintered body electrode for capacitors as described in 1 above, wherein the earth-acid metal is niobium.

4. The sintered body electrode for capacitors as described in 1 above, wherein the electrically conducting oxide of an earth-acid metal is niobium oxide.

5. The sintered body electrode as described in any one of 1 to 4 above, wherein the specific surface area is from 1 to 16 $m^2/g$.

6. The sintered body electrode as described in any one of 1 to 5 above, wherein the product (CV value) of the electrochemical forming voltage and the electrostatic capacitance is from 50,000 to 340,000 μF·V/g.

7. The sintered body electrode as described in any one of 1 to 6 above, wherein the volume is from 4 to 550 $mm^3$.

8. A method for producing a sintered body electrode, comprising a step of shaping and sintering at least one member selected from an earth-acid metal, an alloy mainly comprising an earth-acid metal, an electrically conducting oxide of an earth-acid metal, and a mixture of two or more thereof, and a step of etching the resulting sintered body, wherein the value obtained by dividing the difference between the volume of a sintered body measured under atmospheric pressure and the volume measured in a vacuum, which are determined according to the Archimedes method, by the volume measured under atmospheric pressure is 11% or less.

9. A method for producing a sintered body electrode, comprising a step of partially nitriding a powder comprising at least one member selected from an earth-acid metal, an alloy mainly comprising an earth-acid metal, an electrically conducting oxide of an earth-acid metal, and a mixture of two or more thereof, a step of adding a resin binder thereto and shaping and sintering the powder, and a step of etching the resulting sintered body, wherein the value obtained by dividing the difference between the volume of a sintered body measured under atmospheric pressure and the volume measured in a vacuum, which are determined according to the Archimedes method, by the volume measured under atmospheric pressure is 11% or less.

10. A solid electrolytic capacitor element comprising the sintered body electrode described in any one of 1 to 7 above as one electrode, a dielectric material formed on the surface of the sintered body, and another electrode provided on the dielectric material.

11. The solid electrolytic capacitor element as described in 10 above, wherein the other electrode is at least one member selected from an organic semiconductor and an inorganic semiconductor.

12. The solid electrolytic capacitor element as described in 11 above, wherein the organic semiconductor is at least one member selected from an organic semiconductor comprising benzopyrroline tetramer and chloranil, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

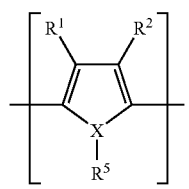

(1)

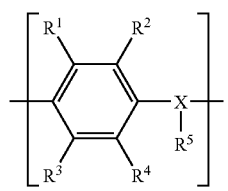

(2)

wherein $R^1$ to $R^4$, which may be the same or different, each represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs $R^1$ and $R^2$, and $R^3$ and $R^4$ may combine with each other to form a ring structure.

13. The solid electrolytic capacitor element as described in 12 above, wherein the electrically conducting polymer containing a repeating unit represented by formula (1) is an electrically conducting polymer containing a structure unit represented by the following formula (3) as a repeating unit:

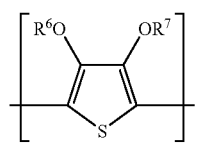

(3)

wherein each of $R^6$ and $R^7$ independently represents a hydrogen atom, a linear or branched, saturated or unsaturated alkyl group having from 1 to 6 carbon atoms, or a substituent for forming at least one 5-, 6- or 7-membered saturated hydrocarbon ring structure containing two oxygen atoms when the alkyl groups are combined with each other at an arbitrary position, and the ring structure includes a structure having a vinylene bond which may be substituted, and a phenylene structure which may be substituted.

14. The solid electrolytic capacitor element as described in 13 above, wherein the electrically conducting polymer is selected from polyaniline, polyoxyphenylene, polyphenylene sulfide, polythiophene, polyfuran, polypyrrole, polymethylpyrrole and substitution derivatives thereof.

15. The solid electrolytic capacitor element as described in 13 above, wherein the electrically conducting polymer is poly(3,4-ethylenedioxythiophene).

16. The solid electrolytic capacitor element as described in 11 above, wherein the inorganic semiconductor is at least one compound selected from molybdenum dioxide, tungsten dioxide, lead dioxide and manganese dioxide.

17. The solid electrolytic capacitor element as described in 11 above, wherein the semiconductor has an electrical conductivity of $10^{-2}$ to $10^3$ S/cm.

18. A method for producing a solid electrolytic capacitor element, comprising a step of electrochemically forming the sintered body electrode described in any one of 1 to 7 above to form a dielectric layer on the surface thereof, and a step of forming the other electrode on the dielectric layer.

19. A solid electrolytic capacitor using one or more solid electrolytic capacitor element(s) described in any one of 10 to 17 above.

20. An electronic circuit using the solid electrolytic capacitor described in 19 above.

21. An electronic device using the solid electrolytic capacitor described in 19 above.

MODE FOR CARRYING OUT THE INVENTION

Figure 1:
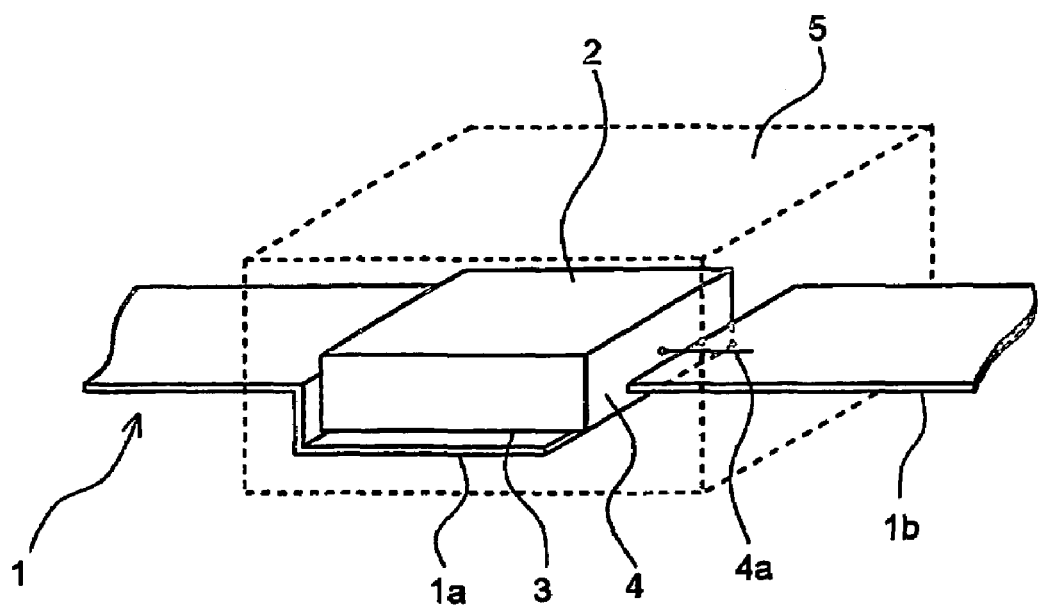
FIG. 1 is a perspective view showing one example of the chip solid electrolytic capacitor of the present invention.

The sintered body electrode of the present invention comprises at least one member selected from an earth-acid metal, an alloy mainly comprising an earth-acid metal, an oxide of an earth-acid metal, and a mixture of two or more thereof. In the present description, "mainly comprising" means to comprise the component in an amount of 50 mass % or more.

The sintered body electrode can be usually produced by appropriately shaping a powder (raw material powder) of the above-described metal, alloy, oxide or mixture together with a binder and after removing the binder, sintering the shaped article.

The production method of the sintered body electrode is not particularly limited, and one example thereof is described below.

A starting material powder is press-formed into a predetermined shape to obtain a shaped article. This shaped article is heated at 500 to 2,000° C. under $10^{-4}$ to $10^{-1}$ Pa for several minutes to several hours to obtain a sintered body. Here, a part of a metal wire mainly comprising a valve-acting metal such as tantalum, niobium and aluminum may be embedded in the shaped article at the shaping and sintered simultaneously with the shaped article, so that the metal wire in the portion protruded from the sintered body can be used as the anode outgoing wire of the sintered body electrode. Also, the metal wire may be connected by welding or the like after sintering and used as the anode outgoing wire. The diameter of such a metal wire is usually 1 mm or less.

Instead of using a metal wire, the above-described powder may be attached to a valve-acting metal foil such as tantalum and niobium and sintered to produce a sintered body electrode where a part of the valve-acting metal foil is working as the anode part.

In the present invention, the earth-acid metal means an element belonging to Group 5 of the Periodic Table, specifically, vanadium, tantalum or niobium. The earth-acid metal is preferably tantalum or niobium. The alloy mainly comprising an earth-acid metal includes those mainly comprising tantalum and/or niobium and containing, as an alloy component, at least one element selected from the group consisting of elements belonging to Groups 2 to 16 of the Periodic Table. The electrically conducting oxide of an earth-acid metal includes tantalum oxide and niobium oxide. A representative electrically conducting oxide of an earth-acid metal is niobium monoxide. These may be used individually or as a mixture of two or more thereof. Also, a part of the earth-acid metal, alloy or electrically conducting oxide of an earth-acid metal may be subjected to at least one treatment selected from carbidation, phosphation, boronation, nitridation and sulfidation before use.

In the sintered body electrode of the present invention, the pseudo-closed porosity defined below is 11% or less, preferably 7% or less. When the pseudo-closed porosity is adjusted to this range, the capacitor element produced by using a semiconductor layer for the counter electrode can have a higher capacitance appearance factor.

In the present invention, the pseudo-closed porosity means a value obtained by dividing the difference between the volume of a sintered body measured under atmospheric pressure and the volume measured in a vacuum, which are determined according to the Archimedes method (a method to determine the density of a sample using the principle that the buoyancy which a solid in liquid receives is equal to the mass of liquid having the same volume of the solid (Archimedes' principle)), by the volume measured under atmospheric pressure. More specifically, the weight of a sintered body for electrode after cutting out the lead wire (described later) from the basal end is measured in air and in pure water, the volume of pure water displaced by the sintered body is determined from the difference of the weights measured (buoyancy) and the density of pure water, this determination is performed under atmospheric pressure and in a vacuum (under pressure in such a degree as causing no boiling of water at an ordinary temperature), and from the obtained values, the pseudo-closed porosity can be calculated according to the following formula:

Pseudo-closed porosity (%)={(volume under atmospheric pressure−volume in a vacuum)/(volume under atmospheric pressure)}×100   Equation 1

The pseudo-closed porosity of the sintered body electrode can be adjusted to a desired value, for example, by appropriately selecting the amount of binder used at the shaping of powder, the sintering conditions (temperature, time), the density of sintered body, etc. and by applying a chemical and/or electrical etching treatment to the surface of the sintered body. Before the etching treatment, the sintered body may be subjected to a degreasing treatment or an ultrasonic wave treatment.

The chemical etching can be performed, for example, by a method of dipping the sintered body in an acid such as nitric acid, hydrochloric acid, sulfuric acid and hydrofluoric acid, or an alkali and a hydrogen peroxide for a predetermined time. The electrochemical etching can be performed by applying a direct current and/or an alternating current to the sintered body in an electrolytic solution.

The pseudo-closed porosity usually tends to increase when the amount of binder is increased, when the CV value of the starting material powder used is high, when the sintering temperature is elevated, or when the density of the sintered body is high. The pseudo-closed porosity decreases when etching is applied. By producing a sintered body while appropriately adjusting these factors, a sintered body having desired properties and having a pseudo-closed porosity of 11% or less can be produced.

Examples of the binder which can be used include acrylic resin, polyvinyl alcohol, camphor and iodide. The amount of the binder used is usually from 0.1 to 20 parts by mass per 100 parts by mass of the earth-acid metal, alloy and/or electrically conducting oxide.

The sintered body electrode of the present invention preferably has an entire porosity of 40 to 70 vol %.

For the sintered body electrode of the present invention, a sintered body having a specific surface area of 1 to 16 $m^2/g$ before etching is preferably used. The specific surface area may increase by about 10% after etching but is usually almost the same before and after etching.

When the sintered body of the present invention is electrochemically formed at 80° C. and a predetermined voltage for 300 minutes in an aqueous 0.1% phosphoric acid solution, it exhibits a CV value of 50,000 to 340,000 µF·V/g (a value measured at 120 Hz with a bias of 1.5 V for 30 seconds at room temperature in an aqueous 30% sulfuric acid solution). If the CV value is less than 50,000 µF·V/g, a capacitor having a large capacitance cannot be obtained, whereas if it exceeds 340,000 µF·V/g, the capacitor has a lower capacitance appearance factor even when the pseudo-closed porosity is adjusted.

In conventional capacitors, the capacitance appearance factor decreases when the volume of the sintered body electrode exceeds 4 $mm^3$. However, in the present invention, even when the sintered body electrode has a large volume, the capacitor produced using it can advantageously exhibit a good capacitance appearance factor. The sintered body electrode of the present invention is not particularly limited in the size and may have, for example, a volume of 4 to 550 $mm^2$. In the present invention, the volume of the sintered body electrode can be made large and therefore, the capacitor produced using the electrode can be made to have an ultrahigh capacitance comparable with an electric double layer capacitor.

A solid electrolytic capacitor can be produced from one electrode which is the sintered body electrode of the present invention, the other electrode and a dielectric oxide film layer interposed therebetween. Examples of the dielectric oxide film layer of the solid electrolytic capacitor include a dielectric oxide film layer mainly comprising diniobium pentoxide or ditantalum pentoxide. For example, the dielectric oxide film layer mainly comprising diniobium pentoxide can be obtained by electrochemically forming the niobium sintered body electrode used for one electrode in an electrolytic solution. The niobium sintered body electrode is electrochemically formed in an electrolytic solution usually by using an aqueous protonic acid solution, for example, an aqueous 0.1% acetic acid solution or an aqueous 0.1% phosphoric acid solution.

Representative examples of the semiconductor layer formed on the dielectric oxide film layer of the present invention include at least one compound selected from an organic semiconductor and an inorganic semiconductor. Specific examples of the organic semiconductor include an organic semiconductor comprising benzopyrroline tetramer and chloranil, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

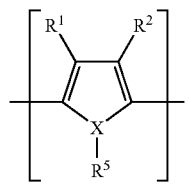

(1)

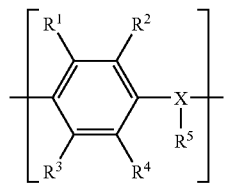

(2)

wherein $R^1$ to $R^4$, which may be the same or different, each represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs $R^1$ and $R^2$, and $R^3$ and $R^4$ may combine with each other to form a ring structure.

In the present invention, the electrically conducting polymer containing a repeating unit represented by formula (1) is preferably an electrically conducting polymer containing a structure unit represented by the following formula (3) as a repeating unit:

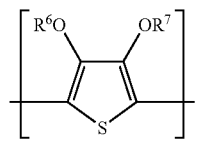

(3)

wherein each of $R^6$ and $R^7$ independently represents a hydrogen atom, a linear or branched, saturated or unsaturated alkyl group having from 1 to 6 carbon atoms, or a substituent for forming at least one 5-, 6- or 7-membered saturated hydrocarbon ring structure containing two oxygen atoms when the alkyl groups are combined with each other at an arbitrary position, and the ring structure includes a structure having a vinylene bond which may be substituted, and a phenylene structure which may be substituted.

The electrically conducting polymer containing such a chemical structure is being electrically charged and a dopant is doped therein. For the dopant, known dopants can be used without limitation.

Examples of the polymer containing a repeating unit represented by formula (1), (2) or (3) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

Specific examples of the inorganic semiconductor include at least one compound selected from molybdenum dioxide, tungsten dioxide, lead dioxide and manganese dioxide.

When the organic or inorganic semiconductor used has an electrical conductivity of $10^{-2}$ to $10^3$ S/cm, the capacitor produced can have a small equivalent series resistance (ESR) value and this is preferred.

In the present invention, an electrically conducting layer is provided on the semiconductor layer formed by the above-described method or the like. The electrically conducting layer can be formed, for example, by the solidification of an electrically conducting paste, plating, vapor deposition of metal, or adhesion of a heat-resistant electrically conducting resin film. Preferred examples of the electrically conducting paste include silver paste, copper paste, aluminum paste, carbon paste and nickel paste, and these may be used individually or in combination of two or more thereof. In the case of using two or more pastes, the pastes may be mixed or may be superposed one on another as separate layers. The electrically conducting paste applied is then solidified by allowing it to stand in air or under heating.

Examples of the plating include nickel plating, copper plating, silver plating and aluminum plating. Examples of the metal vapor-deposited include aluminum, nickel, copper and silver.

More specifically, for example, carbon paste and silver paste are stacked in this order on the sintered body having formed thereon the semiconductor layer.

In this way, a solid electrolytic capacitor element where layers up to the electrically conducting layer are stacked on the sintered body to form the cathode part is produced.

One or a plurality of the solid electrolytic capacitor element(s) having such a constitution of the present invention is(are) jacketed, for example, by resin mold, resin case, metallic jacket case, resin dipping or laminate film and thereby, can be completed as a capacitor product for various uses.

The jacketing with resin mold is described. As shown in FIG. 1, a part of the cathode part (3) of the solid electrolytic capacitor element (2) is placed on one end part (a) of a separately prepared lead frame (1) having a pair of oppositely disposed end parts (1a and 1b), the anode outgoing part (anode part) (4) or anode lead (4a) of the sintered body is placed on the other end part (1b) of the lead frame, each is electrically or mechanically joined, for example, by solidification of an electrically conducting paste for the former and by spot-welding for the latter, the entirety is molded with a resin to form a jacket part (chip molding resin) (5) while leaving outside a part of the end part of the lead frame, and the lead frame is cut and bent at predetermined portions outside the resin mold, thereby producing the solid electrolytic capacitor of the present invention. The lead frame is cut as described above and ultimately works out to external terminals of the solid electrolytic capacitor. The shape thereof is a foil or plate form and for the construction material of the lead frame, iron, copper, aluminum or an alloy mainly comprising such a metal is predominantly used. The lead frame may be partially or entirely plated with solder, tin, titanium or the like. Between the lead frame and the plating, a primer plating such as nickel may be provided. In the lead frame, a pair of oppositely disposed end parts are present and a gap is provided between these end parts, whereby the anode part and the cathode part of each solid electrolytic capacitor element can be insulated from each other.

As for the resin used in molding the solid electrolytic capacitor of the present invention, known resins for use in molding a solid electrolytic capacitor, such as epoxy resin, phenol resin and alkyd resin, can be used. The production machine used for performing the molding with resin is preferably a transfer machine.

The solid electrolytic capacitor of the present invention can be preferably used for circuits using a high-capacitance capacitor, such as voltage stabilizing circuit and noise removing circuit. These circuits can be used in various digital devices such as a personal computer, server, camera, game machine, DVD, AV device and cellular phone, and electronic devices such as various power sources. The solid electrolytic capacitor produced in the present invention has large capacitance for the constant volume and therefore, by using this solid electrolytic capacitor, electronic circuits and electronic devices having a small size and less fluctuation of voltage can be obtained.

BEST MODE FOR CARRYING OUT THE INVENTION

The present invention is described in greater detail by referring to Examples, however, the present invention is not limited to these Examples.

In Examples below, various physical values were determined as follows.

(1) Pseudo-Closed Porosity

The protruding lead wire of the sintered body electrode was cut out from the basal end and the sintered body was suspended in air or in pure water and measured on the weight in each state. From the difference of the weights measured (buoyancy) and the density of pure water, the volume of pure water displaced by the sintered body was determined. This volume was measured under atmospheric pressure (about 0.1 MPa) and in a vacuum (under a pressure of about 0.03 MPa in such a degree as causing no boiling of water at an ordinary temperature) and the pseudo-closed porosity was calculated by applying the obtained values to the following formula:

Pseudo-closed porosity (%)={(volume under atmospheric pressure−volume in a vacuum)/(volume under atmospheric pressure)}×100    Equation 2

(2) Entire Porosity

The volume of a sintered body electrode after cutting out the protruded lead wire from the basal end was determined from the outside dimension thereof, the bulk density was calculated from the obtained volume and the mass of the sintered body electrode, and the entire porosity was calculated according to the following formula. The true density employed was 16.69 g/cm$^3$ for tantalum and 8.57 g/cm$^3$ for niobium (see, *The Merck Index*, 11th ed.).

Entire porosity (%)={1−(bulk density/true density)}×100    Equation 3

(3) Specific Surface Area

BET method (measured by the nitrogen adsorption method using Flousorb manufactured by Shimadzu Corp.)

(4) Capacitance Appearance Factor

The value obtained by dividing the capacitance of the produced solid electrolytic capacitor (where a dielectric oxide film layer and a semiconductor layer were sequentially formed on the sintered body electrode) by a capacitance measured when the sintered body electrode having thereon only a dielectric oxide film layer was dipped in 30% sulfuric acid, was used as the capacitance appearance factor.

These measured values of the sintered body and the solid electrolytic capacitor each is an average of the values obtained by measuring 30 units selected at random from the produced sintered bodies or solid electrolytic capacitors. There are variations in the pseudo-closed porosity (%) with a margin of error of ±0.2 to 0.4%.

EXAMPLES 1 TO 6 AND COMPARATIVE EXAMPLES 1 TO 3

Production of Sintered Body

A tantalum powder having a CV value of 150,000 μF·V/g was left standing in a nitrogen atmosphere to provide a partially nitrided tantalum powder having a nitrided amount of 12,000 ppm by mass. This tantalum powder (38±3 mg) and an acryl binder (polyhexyl methacrylate, produced by Aldrich) in an amount shown in Table 1 were dissolved in toluene and by using the obtained 10 mass % solution and a tantalum lead wire (0.24 mmφ), a shaped article having a size of 4.0×1.0×1.8 mm was produced. A part of the lead wire was embedded in parallel to the longitudinal direction of the shaped article and the remaining was protruded from the shaped article. The protruded lead wire part works out to the anode part of an element. The shaped article produced was sintered at $10^{-3}$ to $10^{-4}$ Pa under the conditions shown in Table 1 to obtain a sintered body. The bulk density of each sintered body obtained is also shown in Table 1.

Each sintered body was left standing in 10 mass % hydrofluoric acid for 15 minutes and then the sintered body excluding a part of the anode outgoing wire was dipped in an aqueous 5 mass % tetramethylammonium hydroxide solution and etched at a current density of 0.5 mA/unit by using a carbon electrode for the counter electrode. The CV, specific surface area, pseudo-closed porosity and entire porosity of each sintered body obtained were measured. The results are shown in Table 2.

Production of Solid Electrolytic Capacitor Element

Each sintered body excluding a part of the lead wire was dipped in an aqueous 0.1% phosphoric acid solution and electrochemically formed at 80° C. for 10 hours by applying 9 V between the sintered body and a tantalum plate electrode as the cathode to form a dielectric oxide film layer composed of $Ta_2O_5$. Thereafter, an operation of dipping this sintered body excluding the lead wire in a 1:1 mixed solution of an aqueous 20% lead acetate solution and an aqueous 35% ammonium persulfate solution, allowing it to stand at 40° C. for 1 hour, and then pulling out, water-washing and drying the sintered body was repeated 45 times to form a semiconductor layer composed of a lead dioxide and lead sulfate mixture (lead dioxide: 97%) on the dielectric oxide film layer. On the semiconductor layer, carbon paste and silver paste were sequentially stacked to complete the cathode part, thereby producing a solid electrolytic capacitor element.

Production of Chip Solid Electrolytic Capacitor

A lead frame comprising a 100 μm-thick copper alloy having a tin-plated surface was separately prepared, where a pair of end parts each in a width of 3.4 mm were present, the end part on which the cathode part was laid had a step of 0.5 mm, and the portion where the cathode part was laid had a length of 4.3 mm (see FIG. 1). The cathode side of the solid electrolytic capacitor element was laid on the end part having a step and connected by the solidification of silver paste and the lead wire as the element anode was electrically and mechanically connected to the other end part by spot welding.

Thereafter, a part of both end parts of the lead frame and the solid electrolytic capacitor element were molded with epoxy resin by transfer molding to produce a chip solid electrolytic capacitor in a size of 7.3×4.3×1.8 mm. After molding, both protruded parts outside the mold each was cut at the position of 2.9 mm from the end face of the mold, the frames cut out were removed, and the end parts connected to the chip solid electrolytic capacitor and remaining outside each was bent along the outer circumference of the capacitor and used as the external terminal.

The capacitance of this chip solid electrolytic capacitor was measured and the capacitance appearance factor obtained therefrom is shown in Table 2.

TABLE 1

|  |  | Amount of Binder Based on Tantalum Powder, mass % | Sintering Temperature · Time | | Bulk Density of Sintered Body, g/cm³ |
|---|---|---|---|---|---|
|  |  |  | ° C. | min. |  |
| Example | 1 | 7 | 1290 | 30 | 6.0 |
|  | 2 | 7 | 1300 | 30 | 6.1 |
|  | 3 | 9 | 1290 | 20 | 5.9 |
|  | 4 | 9 | 1300 | 20 | 6.2 |
|  | 5 | 10 | 1320 | 20 | 6.1 |
|  | 6 | 10 | 1330 | 20 | 6.3 |
| Comparative | 1 | 7 | 1310 | 30 | 6.2 |
| Example | 2 | 6 | 1320 | 30 | 6.3 |
|  | 3 | 5 | 1330 | 30 | 6.4 |

TABLE 2

|  |  | CV of Sintered Body, µF·V/g | Specific Surface Area, m²/g | Pseudo-Closed Porosity, % | Entire Porosity, % | Capacitance Appearance Factor, % |
|---|---|---|---|---|---|---|
| Example | 1 | 147000 | 3.2 | 8 | 63.8 | 92 |
|  | 2 | 142000 | 3.1 | 9 | 63.2 | 91 |
|  | 3 | 149000 | 3.6 | 7 | 64.4 | 95 |
|  | 4 | 140000 | 3.0 | 9 | 62.6 | 92 |
|  | 5 | 143000 | 3.2 | 8 | 63.3 | 91 |
|  | 6 | 138000 | 2.8 | 11 | 62.0 | 90 |
| Comparative | 1 | 141000 | 3.2 | 12 | 62.6 | 82 |
| Example | 2 | 139000 | 2.8 | 12 | 62.0 | 81 |
|  | 3 | 135000 | 2.6 | 14 | 61.4 | 79 |

As seen from Table 2, when tantalum is used as the metal of the sintered body and the pseudo-closed porosity of the sintered body is 11% or less, the capacitor using the sintered body has a large capacitance appearance factor.

Also, it is seen that the pseudo-closed porosity of the sintered body can be adjusted by appropriately selecting the amount of binder, the sintering temperature and the density of sintered body.

EXAMPLES 7 TO 12 AND COMPARATIVE EXAMPLES 4 TO 6

Production of Sintered Body

Niobium powders having various CV values shown in Table 3 each was left standing in a nitrogen atmosphere to provide a partially nitrided niobium powder having a nitrided amount of 12,000 ppm by mass. This niobium powder (81±4 mg) and an acryl binder (polyhexyl methacrylate, produced by Aldrich) in an amount shown in Table 3 were dissolved in toluene and by using the obtained 10 mass % solution and a niobium lead wire (0.29 mmϕ), a shaped article having a size of 4.0×3.2×1.7 mm was produced. A part of the lead wire was embedded in parallel to the longitudinal direction of the shaped article and the remaining was protruded from the shaped article. The protruded lead wire part works out to the element anode part. The shaped article produced was sintered at $10^{-3}$ to $10^{-4}$ Pa under the conditions shown in Table 3 to obtain a sintered body. The bulk density of each sintered body obtained is shown together in Table 3.

Each sintered body was left standing in 10 mass % hydrofluoric acid for 15 minutes and then the sintered body excluding a part of the anode outgoing wire was dipped in an aqueous 5 mass % potassium hydroxide solution and etched at a current density of 0.5 mA/unit by using a carbon electrode for the counter electrode. The CV, specific surface area, pseudo-closed porosity and entire porosity of each sintered body obtained were measured. The results are shown in Table 4.

Production of Solid Electrolytic Capacitor Element

Each sintered body excluding a part of the lead wire was dipped in an aqueous 0.1% phosphoric acid solution and electrochemically formed at 80° C. for 10 hours by applying 20 V between the sintered body and a tantalum plate electrode as the cathode to form a dielectric oxide film layer comprising $Nb_2O_5$. On the dielectric oxide film layer of this sintered body, a semiconductor layer comprising polyethylenedioxythiophene was formed (by dipping the sintered body in an aqueous solution containing ethylenedioxythiophene and anthraquinonesulfonic acid, each dissolved in a trace amount, and performing electrolytic polymerization for 210 hours). On the semiconductor layer, carbon paste and silver paste were sequentially stacked to complete the cathode part, thereby producing a solid electrolytic capacitor element.

Production of Chip Solid Electrolytic Capacitor

A lead frame comprising a 100 m-thick copper alloy having a tin-plated surface was separately prepared, where a pair of end parts each in a width of 3.4 mm were present, the end part on which the cathode part was laid had a step of 0.9 mm, and the portion where the cathode part was laid had a length of 4.3 mm (see FIG. 1). The cathode side of the solid electrolytic capacitor element was laid on the end part having a step and connected by the solidification of silver paste and the lead wire as the element anode was electrically and mechanically connected to the other end part by spot welding.

Thereafter, a part of both end parts of the lead frame and the solid electrolytic capacitor element were molded with epoxy resin by transfer molding to produce a chip solid electrolytic capacitor in a size of 7.3×4.3×2.8 mm. After molding, both protruded parts outside the mold each was cut at the position of 3.4 mm from the end face of the mold, the frames cut out were removed, and the end parts connected to the chip solid electrolytic capacitor and remaining outside each was bent along the outer circumference of the capacitor and used as the external terminal.

The capacitance of this chip solid electrolytic capacitor was measured and the capacitance appearance factor obtained therefrom is shown in Table 4.

TABLE 3

|  |  | CV of Powder, µF · V/g | Amount of Binder Based on Niobium Powder, mass % | Sintering Temperature · Time | | Bulk Density of Sintered Body, g/cm³ |
| --- | --- | --- | --- | --- | --- | --- |
|  |  |  |  | ° C. | min. |  |
| Example | 7 | 110000 | 7 | 1280 | 30 | 3.5 |
|  | 8 | 110000 | 7 | 1300 | 30 | 3.7 |
|  | 9 | 200000 | 9 | 1240 | 30 | 3.4 |
|  | 10 | 200000 | 9 | 1260 | 20 | 3.6 |
|  | 11 | 320000 | 10 | 1200 | 20 | 3.4 |
|  | 12 | 320000 | 10 | 1230 | 20 | 3.7 |
| Comparative | 4 | 110000 | 6 | 1310 | 30 | 3.8 |
| Example | 5 | 200000 | 7 | 1300 | 30 | 3.8 |
|  | 6 | 320000 | 8 | 1270 | 30 | 3.9 |

TABLE 4

|  |  | CV of Sintered Body, µF · V/g | Specific Surface Area, m²/g | Pseudo-Closed Porosity, % | Entire Porosity, % | Capacitance Appearance Factor, % |
| --- | --- | --- | --- | --- | --- | --- |
| Example | 7 | 98000 | 2.0 | 6 | 59.3 | 95 |
|  | 8 | 96000 | 1.9 | 7 | 57.0 | 95 |
|  | 9 | 193000 | 4.7 | 9 | 60.4 | 91 |
|  | 10 | 190000 | 4.4 | 10 | 58.1 | 90 |
|  | 11 | 295000 | 6.2 | 10 | 60.4 | 91 |
|  | 12 | 292000 | 6.0 | 11 | 57.0 | 90 |
| Comparative | 4 | 97000 | 2.0 | 12 | 55.8 | 81 |
| Example | 5 | 186000 | 4.4 | 13 | 55.8 | 78 |
|  | 6 | 290000 | 6.0 | 16 | 54.7 | 71 |

As seen from Table 4, in the case of using niobium is used as the metal of the sintered body and similarly to the case of using tantalum (Table 2), when the pseudo-closed porosity of the sintered body is 11% or less, the capacitor using the sintered body has a large capacitance appearance factor. Also, when the CV value of the sintered body is large, the capacitance appearance factor of the capacitor greatly decreases (see Comparative Examples 4 to 6), but adjusting the pseudo-closed porosity of the sintered body to 11% or less can suppress the decrease in the capacitance appearance factor.

It is seen that the pseudo-closed porosity of the sintered body can be adjusted also by appropriately selecting the CV value.

COMPARATIVE EXAMPLE 7

A solid electrolytic capacitor was produced in the same manner as in Example 10 except that the sintered body was not subjected to a treatment with hydrofluoric acid and a treatment of electrical etching. The pseudo-closed porosity and entire porosity of the sintered body produced and the capacitance appearance factor of the solid electrolytic capacitor are shown in Table 5 together with the values of Example 10.

As apparent from Table 5, the pseudo-closed porosity changes according to the presence or absence of etching and when the pseudo-closed porosity exceeds 11%, the capacitance appearance factor decreases.

TABLE 5

|  | Presence or Absence of Etching | Pseudo-Closed Porosity, % | Entire Porosity, % | Capacitance Appearance Factor, % |
| --- | --- | --- | --- | --- |
| Comparative Example 7 | none | 14 | 55.8 | 75 |
| Example 10 (reference) | present | 10 | 58.1 | 90 |

REFERENCE EXAMPLE 1

A solid electrolytic capacitor was produced in the same manner as in Comparative Example 7 except that the size of the shaped article was changed from 4.0×3.2×1.7 mm (lead wire: 0.29 mmφ) to 1.0×1.00×0.7 mm (lead wire: 0.20 mmφ) and the size of the produced solid electrolytic capacitor was changed from 7.3×4.3×2.8 mm (dimension of lead frame: width: 3.4 mm, length of portion where the cathode part was laid: 4.3 mm) to 3.2×1.6×1.2 mm (dimension of lead frame: width: 1.2 mm, length of portion where the cathode part was laid: 1.2 mm). The pseudo-closed porosity and entire porosity of the sintered body produced and the capacitance appearance factor of the solid electrolytic capacitor are shown in Table 6 together with the values of Comparative Example 7.

As apparent from Table 6, when the size (volume) of the sintered body is small, even if the pseudo-closed porosity exceeds 11%, the capacitance appearance factor is relatively large, however, when the sintered body is large, if the pseudo-closed porosity exceeds 11%, the capacitance appearance factor decreases.

TABLE 6

|  | Volume of Sintered Body, mm³ | Pseudo-Closed Porosity, % | Entire Porosity, % | Capacitance Appearance Factor, % |
|---|---|---|---|---|
| Reference Example 1 | 0.7 | 13 | 57.0 | 90 |
| Comparative Example 7 (reference) | 21.7 | 14 | 55.8 | 75 |

EXAMPLE 13

A niobium powder having a CV value of 130,000 μF·V/g was left standing in a nitrogen atmosphere to provide a partially nitrided niobium powder having a nitrided amount of 14,000 ppm by mass. This niobium powder (654±12 mg) and 50 mg of an acryl binder (polyhexyl methacrylate, produced by Aldrich) were dissolved in toluene and by using the obtained 10 mass % solution and a niobium lead wire (0.33 mmϕ), a shaped article having a size of 9.6×2.1×9.6 mm was produced. A part of the lead wire was embedded in the direction perpendicular to the 9.6×2.1 mm face of the shaped article and the remaining was protruded from the shaped article. The protruded lead wire part works out to the element anode part. The shaped article produced was sintered under the same conditions as in Example 7 (1,280° C., 30 minutes, $10^{-3}$ to $10^{-4}$ Pa) to obtain a sintered body.

This sintered body was left standing in 10 mass % hydrofluoric acid for 15 minutes and then the sintered body excluding a part of the anode outgoing wire was dipped in an aqueous 5 mass % tetramethylammonium hydroxide solution and etched at a current density of 0.5 mA/unit by using a carbon electrode for the counter electrode. The pseudo-closed porosity of the sintered body produced was 8% and the entire porosity was 55.5%.

This sintered body excluding a part of the lead wire was dipped in an aqueous 0.1% phosphoric acid solution and electrochemically formed at 80° C. for 10 hours by applying 20 V between the sintered body and a tantalum plate electrode as the cathode to form a dielectric oxide film layer composed of $Nb_2O_5$. Thereafter, an operation of dipping this sintered body excluding the lead wire in a 1:1 mixed solution of an aqueous 20% lead acetate solution and an aqueous 35% ammonium persulfate solution, allowing it to stand at 40° C. for 1 hour, and then pulling out, water-washing and drying the sintered body was repeated 79 times to form a semiconductor layer composed of a lead dioxide and lead sulfate mixture (lead dioxide: 97%) on the dielectric oxide film layer. On the semiconductor layer, carbon paste and silver paste were sequentially stacked to complete the cathode part, thereby producing a solid electrolytic capacitor element.

Then, separately prepared two tin-plated copper wires having a diameter of 1 mmϕ and a length of 10 mm were connected to the Nb lead wire and silver paste of the solid electrolytic element, respectively, in the same direction by welding for the former and by solidification of the silver paste for the latter to provide outgoing lead wires. Thereafter, the solid electrolytic capacitor element was molded with epoxy powder resin to produce a solid electrolytic capacitor. The capacitance appearance factor of the solid electrolytic capacitor produced was 90%.

COMPARATIVE EXAMPLE 8

A sintered body and then a solid electrolytic capacitor were produced in the same manner as in Example 13 except that the sintering conditions were changed from the same conditions as in Example 7 (1,280° C., 30 minutes, $10^{-3}$ to $10^{-4}$ Pa) to the same conditions as in Comparative Example 4 (1,310° C., 30 minutes, $10^{-3}$ to $10^{-4}$ Pa) and the etching treatment was not performed.

The pseudo-closed porosity and entire porosity of the sintered body produced and the capacitance appearance factor of the solid electrolytic capacitor were 17%, 54.7% and 72%, respectively.

The results in Example 13 and Comparative Example 8 are shown in Table 7. As seen from the results in Table 7, the pseudo-closed porosity varies depending on the presence or absence of etching and the sintering temperature and when the pseudo-closed porosity exceeds 11%, the capacitance appearance factor decreases.

TABLE 7

|  | Sintering Conditions | | Presence or Absence of Etching | Pseudo-Closed Porosity, % | Entire Porosity, % | Capacitance Appearance Factor, % |
|---|---|---|---|---|---|---|
|  | ° C. | min | | | | |
| Example 13 | 1280 | 30 | present | 8 | 55.5 | 90 |
| Comparative Example 8 | 1310 | 30 | none | 17 | 54.7 | 72 |

INDUSTRIAL APPLICABILITY

According to the present invention using an earth-acid metal-base sintered body having a pseudo-closed porosity of 11% or less, a solid electrolytic capacitor having an excellent capacitance appearance factor can be produced. In particular, even when the sintered body has a large CV value or volume, a solid electrolytic capacitor having an excellent capacitance appearance factor can be produced by adjusting the pseudo-closed porosity to 11% or less.

The pseudo-closed porosity of the sintered body can be easily adjusted to 11% or less without particularly providing a new step by appropriately selecting the amount of binder, the sintering conditions, the density of sintered body, and the like at the time of producing the shaped article, or by selecting the etching conditions.

The invention claimed is:

1. A sintered body electrode for capacitors, comprising at least one member selected from an earth-acid metal, an alloy mainly comprising an earth-acid metal, an electrically conducting oxide of an earth-acid metal, and a mixture of two or more thereof, wherein the value obtained by dividing the difference between the volume of a sintered body measured under atmospheric pressure and the volume measured in a vacuum, which are determined according to the Archimedes method, which is a method for determining the density of a sample using Archimedes' principle that the buoyancy which a solid in liquid receives is equal to the mass of liquid having the same volume of the solid, by the volume measured under atmospheric pressure is 11% or less.

2. The sintered body electrode for capacitors as claimed in claim 1, wherein the earth-acid metal is tantalum.

3. The sintered body electrode for capacitors as claimed in claim 1, wherein the earth-acid metal is niobium.

4. The sintered body electrode for capacitors as claimed in claim 1, wherein the electrically conducting oxide of an earth-acid metal is niobium oxide.

5. The sintered body electrode as claimed in claim 1, wherein the specific surface area is from 1 to 16 m²/g.

6. The sintered body electrode as claimed in claim 1, wherein the product (CV value) of the electrochemical forming voltage and the electrostatic capacitance is from 50,000 to 340,000 µF·V/g.

7. The sintered body electrode as claimed in claim 1, wherein the volume is from 4 to 550 mm³.

8. A solid electrolytic capacitor element comprising the sintered body electrode described in claim 1 above as one electrode, a dielectric material formed on the surface of the sintered body, and another electrode provided on the dielectric material.

9. The solid electrolytic capacitor element as claimed in claim 8, wherein the other electrode is at least one member selected from an organic semiconductor and an inorganic semiconductor.

10. The solid electrolytic capacitor element as claimed in claim 9, wherein the organic semiconductor is at least one member selected from an organic semiconductor comprising benzopyrroline tetramer and chloranil, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

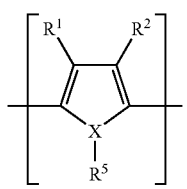
(1)

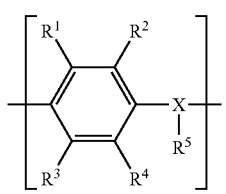
(2)

wherein R¹ to R⁴, which may be the same or different, each represents a hydrogen atom, an alkyl group having from 1 to 6 carbon atoms or an alkoxy group having from 1 to 6 carbon atoms, X represents an oxygen atom, a sulfur atom or a nitrogen atom, R⁵ is present only when X is a nitrogen atom, and represents a hydrogen atom or an alkyl group having from 1 to 6 carbon atoms, and each of the pairs R¹ and R², and R³ and R⁴ may combine with each other to form a ring structure.

11. The solid electrolytic capacitor element as claimed in claim 10, wherein the electrically conducting polymer containing a repeating unit represented by formula (1) is an electrically conducting polymer containing a structure unit represented by the following formula (3) as a repeating unit:

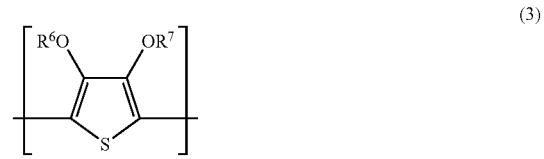

wherein each of R⁶ and R⁷ independently represents a hydrogen atom, a linear or branched, saturated or unsaturated alkyl group having from 1 to 6 carbon atoms, or a substituent for forming at least one 5-, 6- or 7-membered saturated hydrocarbon ring structure containing two oxygen atoms when the alkyl groups are combined with each other at an arbitrary position, and the ring structure includes a structure having a vinylene bond which may be substituted, and a phenylene structure which may be substituted.

12. The solid electrolytic capacitor element as claimed in claim 11, wherein the electrically conducting polymer is selected from polyaniline, polyoxyphenylene, polyphenylene sulfide, polythiophene, polyfliran, polypyrrole, polymethylpyrrole and substitution derivatives thereof.

13. The solid electrolytic capacitor element as claimed in claim 11, wherein the electrically conducting polymer is poly(3,4-ethylenedioxythiophene).

14. The solid electrolytic capacitor element as claimed in claim 9, wherein the inorganic semiconductor is at least one compound selected from molybdenum dioxide, tungsten dioxide, lead dioxide and manganese dioxide.

15. The solid electrolytic capacitor element as claimed in claim 9, wherein the semiconductor has an electrical conductivity of $10^{-2}$ to $10^3$ S/cm.

16. A solid electrolytic capacitor using one or more solid electrolytic capacitor element(s) claimed in claim 8.

17. An electronic circuit using the solid electrolytic capacitor claimed in claim 16.

18. An electronic device using the solid electrolytic capacitor claimed in claim 16.

19. A method for producing a solid electrolytic capacitor element, comprising a step of electrochemically forming the sintered body electrode claimed in claim 1 to form a dielectric layer on the surface thereof, and a step of forming the other electrode on the dielectric layer.

20. A method for producing a sintered body electrode, comprising a step of shaping and sintering at least one member selected from an earth-acid metal, an alloy mainly comprising an earth-acid metal, an electrically conducting oxide of an earth-acid metal, and a mixture of two or more thereof, and a step of etching the resulting sintered body, wherein the value obtained by dividing the difference between the volume of a sintered body measured under atmospheric pressure and the volume measured in a vacuum, which are determined according to the Archimedes method, which is a method for determining the density of a sample using Archimedes' principle that the buoyancy which a solid in liquid receives is equal to the mass of liquid having the same volume of the solid, by the volume measured under atmospheric pressure is 11% or less.

21. A method for producing a sintered body electrode, comprising a step of partially nitriding a powder comprising at least one member selected from an earth-acid metal, an alloy mainly comprising an earth-acid metal, an electrically conducting oxide of an earth-acid metal, and a mixture of two or more thereof, a step of adding a resin binder thereto and shaping and sintering the powder, and a step of etching the resulting sintered body, wherein the value obtained by dividing the difference between the volume of a sintered body measured under atmospheric pressure and the volume measured in a vacuum, which are determined according to the Archimedes method, which is a method for determining the density of a sample using Archimedes' principle that the buoyancy which a solid in liquid receives is equal to the mass of liquid having the same volume of the solid, by the volume measured under atmospheric pressure is 11% or less.

* * * * *